US012681859B2

(12) United States Patent
Yosef Leibowitch Ben Ari

(10) Patent No.: US 12,681,859 B2
(45) Date of Patent: Jul. 14, 2026

(54) MEMORY COPY IN MESH NETWORKS

(71) Applicant: Google LLC, Mountain View, CA (US)

(72) Inventor: Roi Yosef Leibowitch Ben Ari, Jerusalem (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/214,006

(22) Filed: Jun. 26, 2023

(65) Prior Publication Data

US 2024/0427702 A1     Dec. 26, 2024

(51) Int. Cl.
*G06F 12/08* (2016.01)
*G06F 12/0811* (2016.01)
*G06F 12/0817* (2016.01)

(52) U.S. Cl.
CPC ...... *G06F 12/0822* (2013.01); *G06F 12/0811* (2013.01); *G06F 2212/1016* (2013.01)

(58) Field of Classification Search
CPC ............. G06F 12/0822; G06F 12/0811; G06F 12/0815; G06F 2212/1016; G06F 2212/1024; G06F 2212/152; G06F 2212/305; G06F 2212/65; G06F 2212/657; G06F 12/0813; G06F 12/0828; G06F 12/0833
See application file for complete search history.

(56) References Cited

U.S. PATENT DOCUMENTS

| | | | |
|---|---|---|---|
| 7,536,513 B2 | 5/2009 | Guthrie et al. | |
| 8,305,936 B2 | 11/2012 | Wang | |
| 8,495,308 B2 | 7/2013 | Guthrie et al. | |
| 10,769,021 B1* | 9/2020 | Salamon | G06F 11/1064 |
| 2001/0047412 A1* | 11/2001 | Weinman, Jr. | G06F 3/067 |
| | | | 709/219 |
| 2004/0019751 A1* | 1/2004 | Sharma | G06F 12/0817 |
| | | | 711/E12.027 |
| 2004/0123052 A1* | 6/2004 | Beers | G06F 12/0831 |
| | | | 711/144 |
| 2005/0055328 A1* | 3/2005 | Yagawa | G06F 16/254 |
| 2006/0123212 A1* | 6/2006 | Yagawa | G06F 11/2076 |
| | | | 711/162 |
| 2009/0070524 A1* | 3/2009 | Wood | G06F 12/0815 |
| | | | 711/151 |
| 2018/0173660 A1* | 6/2018 | Geng | G06F 12/0888 |
| 2019/0340138 A1* | 11/2019 | Mannava | G06F 13/1668 |
| 2019/0340147 A1* | 11/2019 | Jalal | G06F 15/1735 |
| 2020/0125518 A1* | 4/2020 | Ringe | G06F 12/0811 |

(Continued)

OTHER PUBLICATIONS

ARM® 'AMBA CHI 1.0' Documentation (Version 1.0, Published Jun. 2021); Accessed via arm.com; pp. 1, 7-8, 28-31 (Year: 2021).*

(Continued)

*Primary Examiner* — Rocio Del Mar Perez-Velez
*Assistant Examiner* — Julian S Mendel
(74) *Attorney, Agent, or Firm* — Lerner David LLP

(57)     ABSTRACT

Aspects of the disclosure are directed to configuring one or more system level caches to perform memory copy in a mesh network. The system level caches can perform a write to a write destination or perform a write to another system level cache that performs the write to the write destination. The system level caches allow for avoiding redundant traffic, as data no longer needs to be sent to and from a CPU when performing memory copy.

20 Claims, 8 Drawing Sheets

(56)             References Cited

U.S. PATENT DOCUMENTS

2020/0301854  A1*   9/2020  Ramagiri ............ G06F 12/1441
2021/0126877  A1*   4/2021  Jalal ........................ H04L 49/25

OTHER PUBLICATIONS

YouTube® broadcast entitled "Cache Stashing—Timing Example",
published Mar. 23, 2022; accessed at https://www.youtube.com/
watch?v=E1ietgiRkPk (Year: 2022).*
Extended European Search Report for European Patent Application
No. 23213691.1 dated May 2, 2024. 9 pages.

* cited by examiner

300

Receive a copy request to copy data          310

Send a read request to a first subordinate node          320

Receive the data from the first subordinate node          330

Send a write request to a second subordinate node          340

Receive an acknowledgement that the data can be written          350

Send the data to the second subordinate node          360

500

Receive a copy request — 510

Send a read request to a request node — 520

Receive data from the request node — 530

Send a write request to a subordinate node — 540

Receive an acknowledgement that the data can be written — 550

Send the data to the subordinate node — 560

700

MEMORY COPY IN MESH NETWORKS

BACKGROUND

In a mesh network, memory copy is typically performed by copying data to a central processing unit (CPU) and writing the data back from the CPU to a destination. However, this creates redundant traffic since the CPU only uses the data to perform the copy operation.

BRIEF SUMMARY

Aspects of the disclosure are directed to configuring one or more system level caches to perform memory copy in a mesh network. The system level caches can perform a write to a write destination or perform a write to another system level cache that performs the write to the write destination. The system level caches allow for avoiding redundant traffic, as data no longer needs to be sent to and from a CPU when performing memory copy.

An aspect of the disclosure provides for a method for copying data in a mesh network including: receiving, by one or more processors, a copy request to copy data to a destination; sending, by the one or more processors, a read request to a first subordinate node; receiving, by the one or more processors, the data from the first subordinate node; sending, by the one or more processors, a write request to a second subordinate node to write the data with a new write address; receiving, by the one or more processors, an acknowledgement that the data can be written to the second subordinate node; and sending, by the one or more processors, the data to the second subordinate node.

In an example, the copy request includes a read to write request. In another example, the first subordinate node includes one or more read addresses. In yet another example, the second subordinate node includes one or more write addresses.

In yet another example, the method further includes receiving, by the one or more processors, an acknowledgement that the data has been read. In yet another example, the data from the first subordinate node and the acknowledgement that the data has been read are received in a combined transaction. In yet another example, the method further includes sending, by the one or more processors, an acknowledgement that the copy request has been performed.

In yet another example, the first subordinate node is located on a node from which the copy request is received. In yet another example, the one or more processors include a system level cache.

Another aspect of the disclosure provides for a system including: one or more processors; and one or more storage devices coupled to the one or more processors and storing instructions that, when executed by the one or more processors, cause the one or more processors to perform operations for copying data in a mesh network, the operations including: receiving a copy request to copy data to a destination; sending a read request to a first subordinate node; receiving the data from the first subordinate node; sending a write request to a second subordinate node to write the data with a new write address; receiving an acknowledgement that the data can be written to the second subordinate node; and sending the data to the second subordinate node.

In an example, the copy request includes a read to write request. In another example, the first subordinate node includes one or more read addresses. In yet another example, the second subordinate node includes one or more write addresses.

In yet another example, the operations further include receiving an acknowledgement that the data has been read. In yet another example, the data from the first subordinate node and the acknowledgement that the data has been read are received in a combined transaction. In yet another example, the operations further include sending an acknowledgement that the copy request has been performed.

In yet another example, the first subordinate node is located on a node from which the copy request is received. In yet another example, the one or more processors include a system level cache.

Yet another aspect of the disclosure provides for a non-transitory computer readable medium for storing instructions that, when executed by one or more processors, cause the one or more processors to perform operations for copying data in a mesh network, the operations including: receiving a copy request to copy data to a destination; sending a read request to a first subordinate node; receiving the data from the first subordinate node; sending a write request to a second subordinate node to write the data with a new write address; receiving an acknowledgement that the data can be written to the second subordinate node; and sending the data to the second subordinate node.

In an example, the operations further include: receiving an acknowledgement that the data has been read; and sending an acknowledgement that the copy request has been performed.

DETAILED DESCRIPTION

Figure 1:
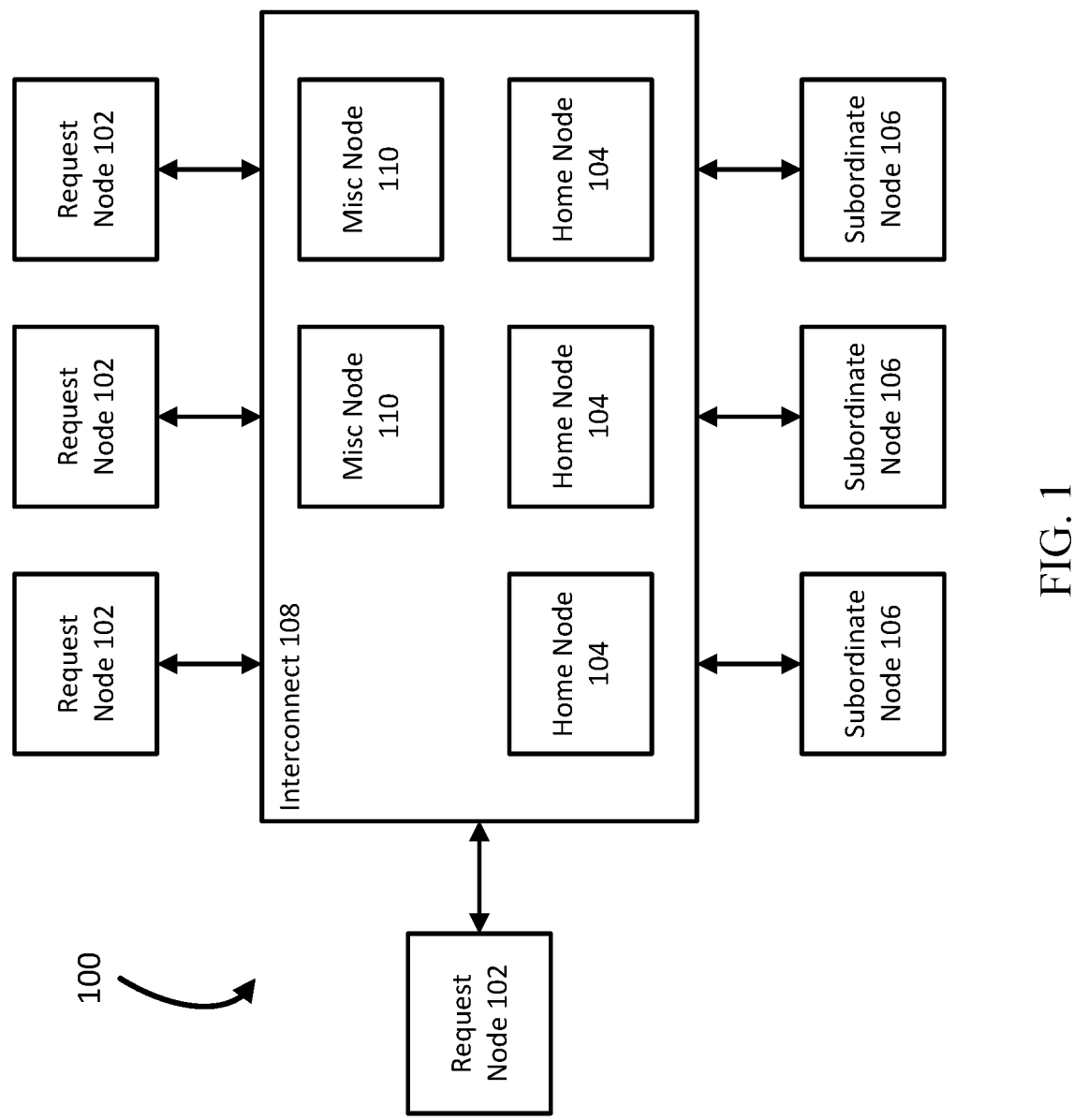
FIG. 1 depicts a block diagram of an example mesh network according to aspects of the disclosure.

The technology generally relates to a mesh network using one or more system level caches to perform memory copy. The system level caches can perform a write to a final write destination or perform the write to another system level cache that performs the write to the final write destination.

A mesh network is a network in which nodes are linked together, branching off other nodes to efficiently route data between devices and clients. A mesh network may contain fully coherent request nodes (RNF), home nodes (HNF) also referred to as system level caches, and/or subordinate nodes (SNF). Fully coherent may refer to the node caching data locally in one or more system level caches and responding to snoop requests. Snoop requests may be a protocol for maintaining cache coherency, a situation where multiple processor cores share the same memory. A request node is configured to initiate transactions and send requests towards memory. The home node is configured to issue any required snoop requests to RNFs or memory access requests to SNFs in order to complete a transaction. A subordinate node interfaces with the memory controllers, a digital circuit that manages the flow of data going to and from memory.

To perform memory copy, a request node can send a copy request to a home node to copy data. The home node can send a read request to a first subordinate node to read the data. Alternatively, or additionally, if the data is stored in a request node, the home node may send the read request to that request node. As an example, the read request can be a read without snoop request. The first subordinate node can send the data to the home node as well as an acknowledgement that the data has been read. The home node can send a write request to a second subordinate node to write the data with a new write address. Alternatively, or additionally, the home node may send the write request to a second home node that will write the data to a second subordinate node. As an example, the write request can be a write without snoop request. The second subordinate node can send an acknowledgement to the home node that the data can be written. The home node can then send the data to the second subordinate node as well as an acknowledgement to the request node that the copy has been performed. The second subordinate node can write the data to perform the copy function.

For example, the RNF can send a Read to Write request to the HNF to access devices or storage media from or to which data can be read or written. The HNF may then send a read request, such as a ReadNoSnp transaction, to a SNF read address. The SNF read address may then send a combined read data and completion response, for example a CompData transaction, back to the HNF, to which the HNF can send a write request, such as a WriteNoSnp request, requesting a copy of the accessed data to a SNF write address. The SNF write address may then send a combined data request and completion response, such as a CompD-BIDResp transaction, to the HNF. A CompDBIDResp is a response that indicates that the SNF write address can accept write data and that the write request is observable by other RNFs. The HNF may then send a completion response, such as a Comp transaction, to the RNF and a send write data request, such as NCBWrData transaction, to the SNF write address to instruct the SNF write address to perform the copy function. ReadNoSnp, WriteNoSnp, CompDBIDResp, and other transactions described here can be defined as part of a communication protocol between nodes, as examples.

FIG. 1 depicts a block diagram of a mesh network 100 for performing memory copy. A mesh network 100 is a type of network where each node in the mesh network 100 may act as an independent gateway, router, and/or switch, regardless of whether it is connected to another communications network or not. Mesh networks 100 allow for continuous connections, disconnections, and reconfigurations until a desired destination is reached. Mesh networks 100 differ from other communications networks, such as the Internet, intranet, or other data network, in that component parts can all connect to each other via multiple hops. Mesh networks 100 can be self-healing, where the mesh network 100 can still operate when one node breaks down or a connection malfunctions. As a result, the mesh networks 100 can be highly reliable, as there is often more than one path between a source and a destination in the mesh network 100.

In a mesh network 100, only one node may be physically connected to a network connection like a DSL or cable modem. That one node can then share its connection with all other mesh nodes in its vicinity. Those mesh nodes can then share the connection with the nodes closest to them. The more nodes, the further the connection spreads, creating a mesh cloud of connectivity that can serve both small and large areas.

The mesh network 100 can employ a full mesh topology or partial mesh topology. In the full mesh topology, each node is a mesh network device connected directly to each of the other mesh network devices. In the partial mesh topology, some mesh network devices are connected to all the others, but other mesh network devices are connected only to those other mesh network devices with which they exchange data. The connections can be wired or wireless in a mesh network or partial mesh network topologies. A mesh network 100 is reliable and offers redundancy. If one mesh node can no longer operate, all the rest can still communicate with each other, directly or through one or more intermediate nodes.

The mesh network 100 can include one or more request nodes 102, home nodes 104, and subordinate nodes 106 connected via an interconnect 108. The request nodes 102, home nodes 104, and/or subordinate nodes 106 can be fully coherent, input/output (I/O) coherent, or non-coherent. Fully coherent nodes may include a cache and can generate any transactions defined by a protocol. I/O coherent nodes may not include a cache and can generate I/O transactions of the protocol. Non-coherent nodes may not include a cache and can generate a subset of transactions of the protocol.

Request nodes 102 may refer to nodes that generate protocol transactions, such as read, write, and/or atomic transactions, to the interconnect 108. Home nodes 104, also referred to as system level caches, may refer to nodes located within the interconnect 108 that receive protocol transactions from request nodes 102, complete coherency actions, if any, and return a response. Subordinate nodes 106, also referred to as completers or endpoints, may refer to nodes that receive requests from home nodes 104, complete an action, and return a response. The mesh network 100 can further include one or more miscellaneous nodes 110 within the interconnect 108 configured to receive a transaction from a request node 102, complete an action, and return a response.

The mesh network 100 can include any number of request nodes 102, home nodes 104, and subordinate nodes 106. Further, the request nodes 102, home nodes 104, and subordinate nodes 106 can be connected to one or more other request nodes 102, home nodes 104, and subordinate nodes 106, depending on the particular configuration of the mesh network 100.

Figure 2:
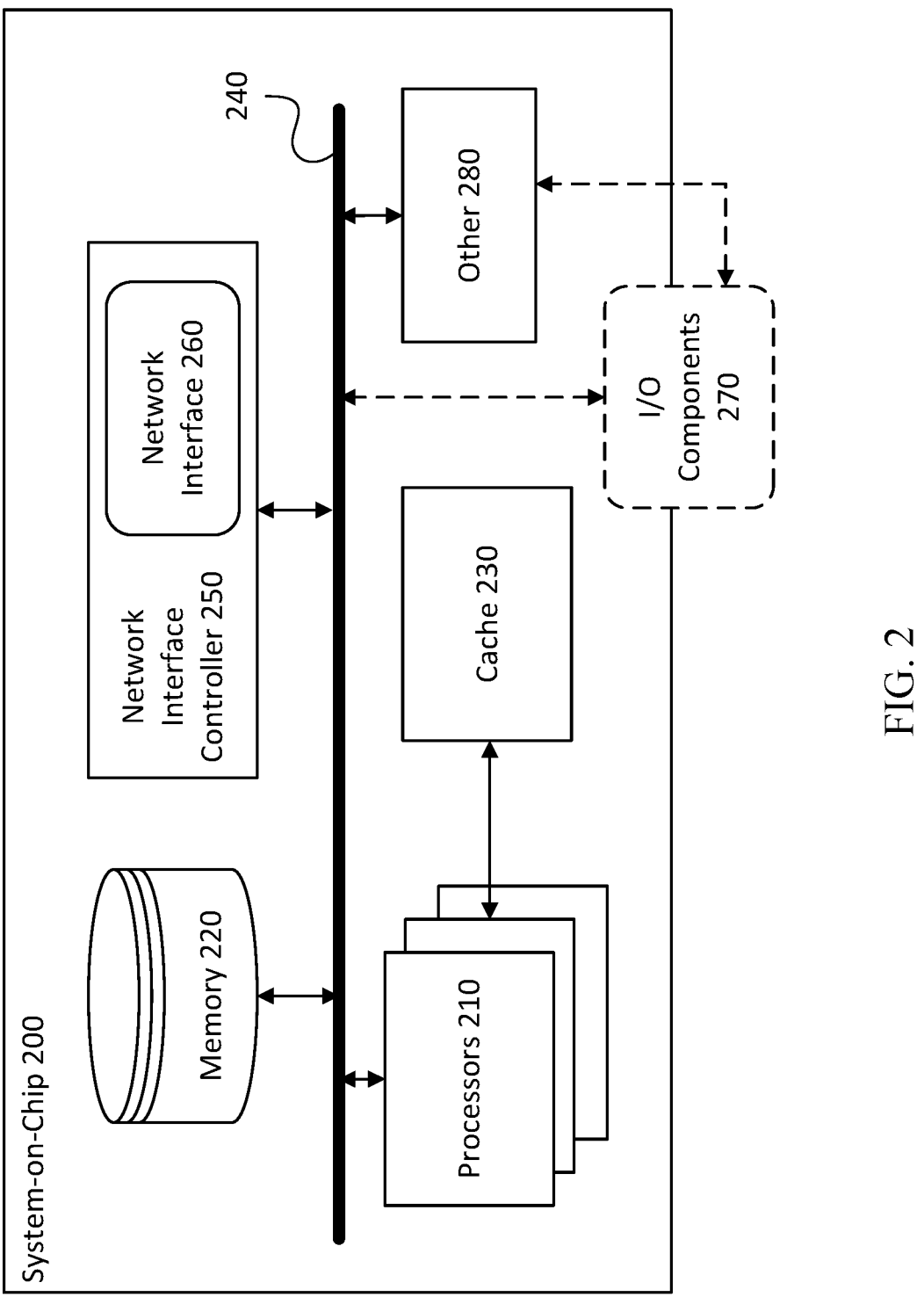
FIG. 2 depicts a block diagram of an example system-on-chip for a mesh network according to aspects of the disclosure.

FIG. 2 depicts a block diagram of an example system-on-chip (SOC) 200 for a mesh network. The SOC 200 can correspond to any of the request nodes 102, home nodes 104, or subordinate nodes 106 of the mesh network 100 as depicted in FIG. 1. The SOC 200 can include one or more processors 210 in communication with memory 220, at least one network interface controller 250 with a network interface port 260 for connection to a network, input/output (I/O) components 270, and other components 280. The processors 210 can be in communication with or connected to the memory 220, network interface controller 250, I/O components 270, and/or other components 280 via a bus 240. The processors 210 can incorporate or are connected to a cache memory 230. In some examples, instructions are read from the memory 220 into the cache memory 230 and executed by the processors 210 from the cache memory 230.

The processors 210 can be any logic circuitry that executes instructions fetched from the memory 220 or cache 230. The processors 210 can be microprocessor units or special purpose processors. The SOC 200 can be based on any processor, or set of processors, capable of operating as described herein. The processors 210 can be single core or multi-core processors. The processors 210 can be multiple distinct processors. The processors 210 can be implemented as circuitry on one or more chips.

The memory 220 can be any device suitable for storing computer readable data. The memory 220 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The SOC 200 can have any number of memory devices 220.

The cache memory 230 can be a form of computer memory placed in close proximity to the processors 210 for fast access times. The cache memory 230 can be part of, or on the same chip as, the processors 210. There can be multiple levels of cache 230, e.g., level 2 and level 3 cache layers.

The network interface controller 250 can manage data exchanges via the network interface 260. The network interface controller 250 can handle the physical and data link layers of the open systems interconnection (OSI) model for network communication. Some of the tasks of the network interface controller 250 can be handled by one or more of the processors 210. The network interface controller 250 can be incorporated into the processors 210, such as circuitry on the same chip.

The SOC 200 can have multiple network interfaces 260 controlled by a single controller 250 or multiple network interface controllers 250. Each network interface 260 can be a connection point for a physical network link, e.g., a cat-5 or cat-6 Ethernet link. The network interface controller 250 can support wireless network connections and an interface port 260 can be a wireless, e.g., radio, receiver/transmitter. The network interface controller 250 can implement one or more network protocols. The SOC 200 can exchange data with other SOCs via physical or wireless links through the network interface 260. The network interface 260 can link directly to another device or to another device via an intermediary device, e.g., a hub, a bridge, a switch, or a router, connecting the SOC 200 to the mesh network.

The SOC 200 can include, or provide interfaces for, one or more input or output (I/O) components 270. Input devices can include keyboards, microphones, touch screens, sensors, and pointing devices, such as a mouse or trackball, as examples. Output devices can include video displays, speakers, and printers, as examples.

Other components 280 can include an I/O interface, external serial device ports, and any additional co-processors. For example, the SOC 200 can include an interface, e.g., a universal serial bus (USB) interface, for connecting input devices, output devices, or additional memory devices, e.g., portable flash drive or external media drive. The SOC 200 can include an additional co-processor, such as a math co-processor to assist the processors 210 with high precision or complex calculations.

Figure 3:
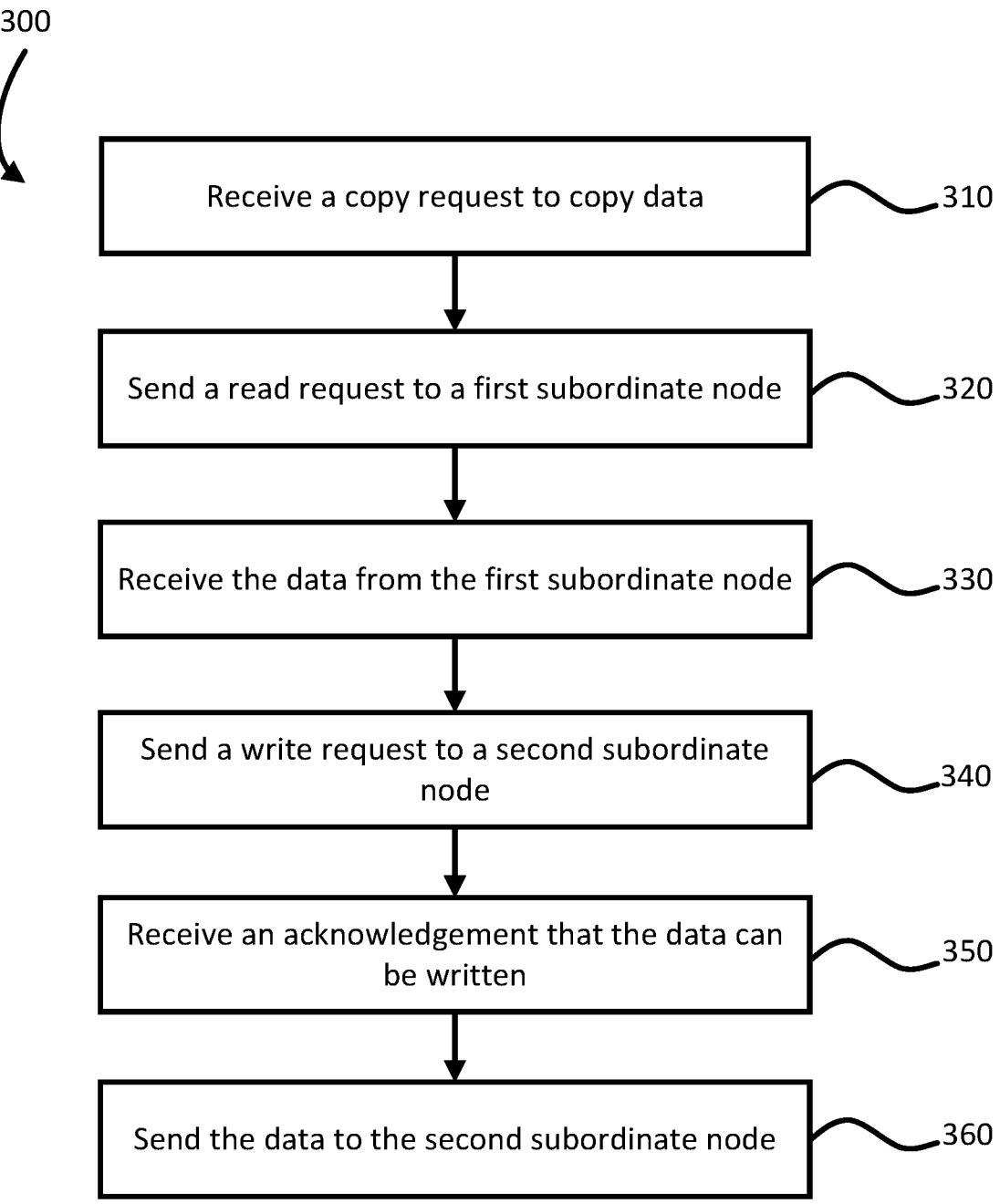
FIG. 3 depicts a flow diagram of an example process for performing memory copy in a mesh network according to aspects of the disclosure.

FIG. 3 depicts a flow diagram of an example process 300 for performing memory copy in a mesh network. The example process 300 can be performed on a system of one or more processors in one or more locations, such as an example home node 104 of the mesh network 100 as depicted in FIG. 1.

As shown in block 310, the home node 104 can receive a copy request to copy data. The home node 104 can receive the copy request from a request node, such as an example request node 102 as depicted in FIG. 1.

As shown in block 320, the home node 104 can send a read request to a first subordinate node to read the data. The first subordinate node can be one of the example subordinate nodes 106 as depicted in FIG. 1. The read request can be a read without snoop request. The first subordinate node 106 can include a read address for reading the data.

As shown in block 330, the home node 104 can receive the data from the first subordinate node 106. The home node 104 can also receive an acknowledgment from the first subordinate node 106 that the data has been read. The home node 104 can receive the data and the acknowledgement in a combined transaction or in separate transactions. The first subordinate node 106 can determine the data is included in the read address, and in response, send the acknowledgement and the data.

As shown in block 340, the home node 104 can send a write request to a second subordinate node to write the data. The second subordinate node can be one of the example subordinate nodes 106 as depicted in FIG. 1. The write request can be a write without snoop request. The second subordinate node 106 can include a write address for writing the data.

As shown in block 350, the home node 104 can receive an acknowledgement that the data can be written. The home node 104 can receive the acknowledgement from the second subordinate node 106. The second subordinate node 106 can determine there is sufficient space for the data, and in response, send the acknowledgement.

As shown in block 360, the home node 104 can send the data to the second subordinate node 106. The second subordinate node 106 can write the data in the write address to perform the memory copy. The home node 104 can also send an acknowledgement to the request node 102 that the memory copy has been performed.

Figure 4:
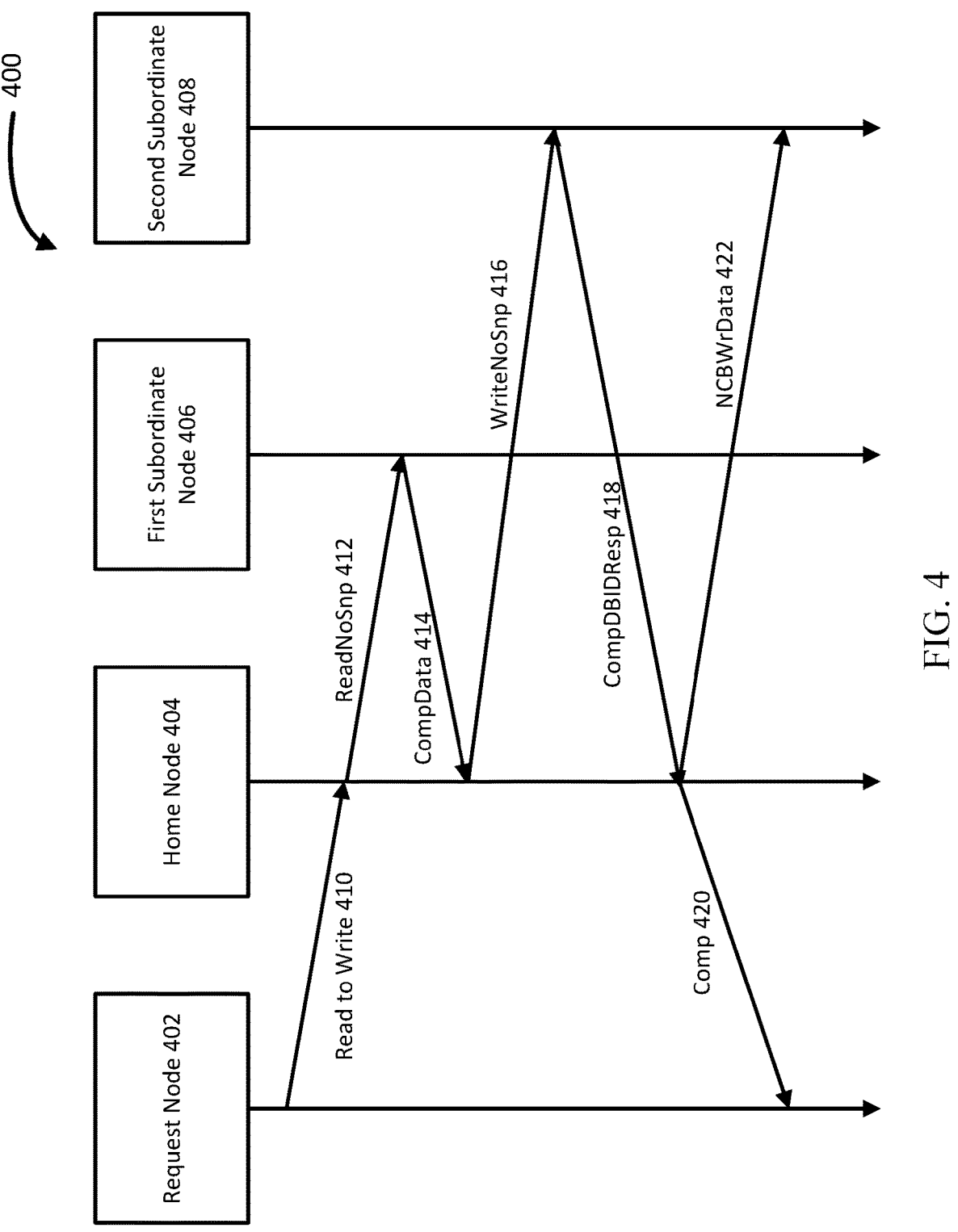
FIG. 4 depicts a swim diagram of example transactions that occur when performing memory copy according to aspects of the disclosure.

FIG. 4 depicts a swim diagram of example transactions 400 that can occur when performing memory copy in a mesh network. The swim diagram can include a request node 402, a home node 404, a first subordinate node 406, and a second subordinate node 408.

As an example, the request node 402 can send a read request, such as a read to write transaction 410, to the home node 404 to access devices or storage media from or to which data can be read or written. The home node 404 can send a read request, such as a ReadNoSnp transaction 412, to a read address of the first subordinate node 406. The first subordinate node 406 can send a combined read data and completion response, such as a CompData transaction 414, back to the home node 404. The home node 404 can send a write request, such as a WriteNoSnp transaction 416, requesting to copy the data to a write address of the second subordinate node 408. The second subordinate node 408 can send a combined data request and completion response, such as a CompDBIDResp transaction 418, to the home node 404. The CompDBIDResp transaction 418 can indicate that the write address of the second subordinate node 408 can accept write data and/or that the write request is observable by other request nodes. The home node 404 can send a completion response, such as a Comp transaction 420, to the request node 402. The home node 404 can further send the write data, such as a NCBWrData transaction 422, to the write address of the second subordinate node 408 to instruct the second subordinate node 408 to perform the copy function.

Figure 5:
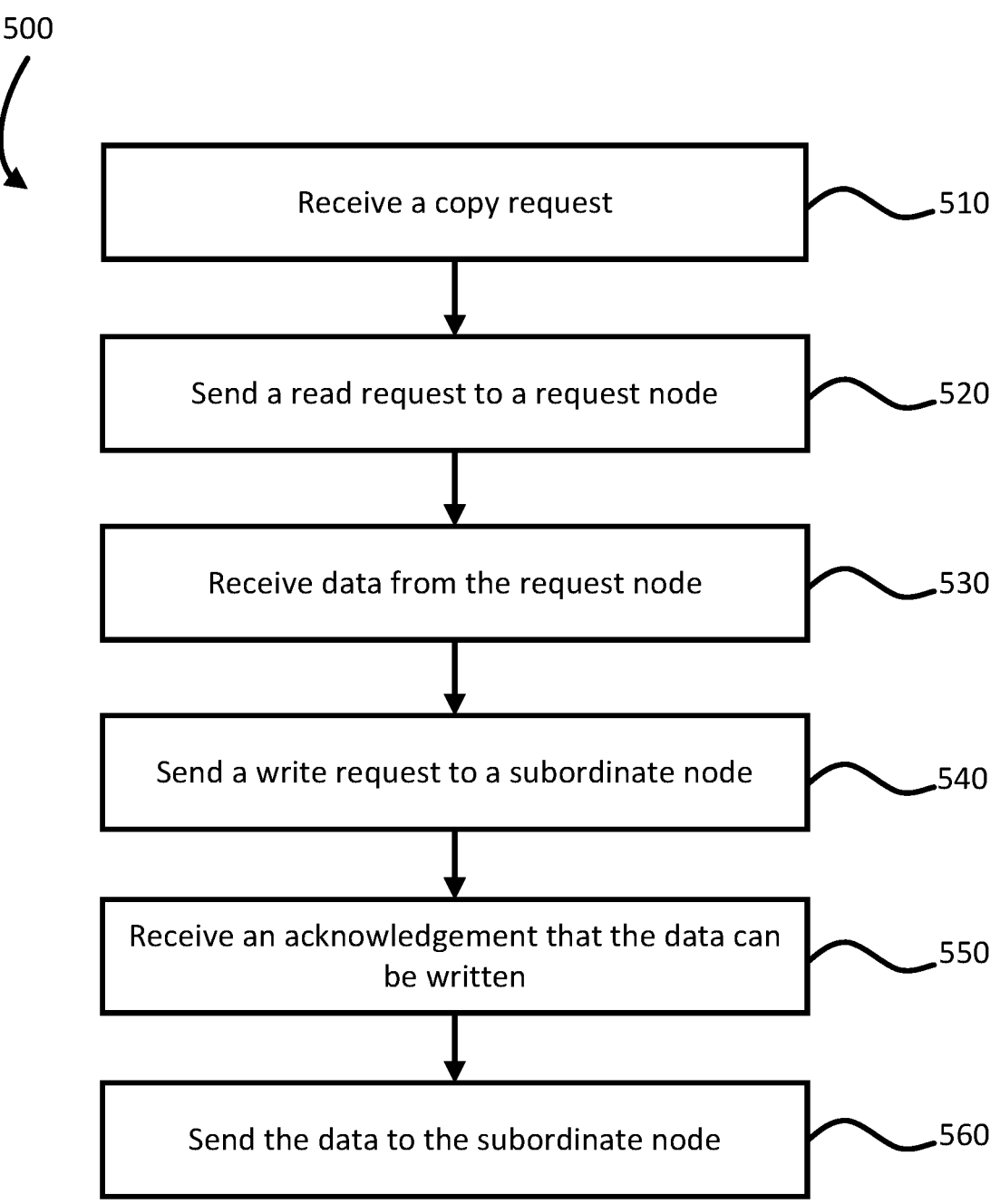
FIG. 5 depicts a flow diagram of an example process for performing memory copy in a mesh network where data for copying originates from a request node according to aspects of the disclosure.

FIG. 5 depicts a flow diagram of an example process 500 for performing memory copy in a mesh network where data for copying originates from a request node. The example process 500 can be performed on a system of one or more processors in one or more locations, such as an example home node 104 of the mesh network 100 as depicted in FIG. 1.

As shown in block 510, the home node 104 can receive a copy request to copy data. The home node 104 can receive the copy request from a first request node, such as an example request node 102 as depicted in FIG. 1.

As shown in block 520, the home node 104 can send a read request to a second request node 102 to read the data, such as an example request node 102 as depicted in FIG. 1. The read request can be a read without snoop request. The second request node 102 can include a read address for reading the data.

As shown in block 530, the home node 104 can receive the data from the second request node 102. The home node 104 can also receive an acknowledgment from the second request node 102 that the data has been read. The home node 104 can receive the data and the acknowledgement in a combined transaction or in separate transactions. The second request node 102 can determine the data is included in the read address, and in response, send the acknowledgement and the data.

As shown in block 540, the home node 104 can send a write request to a subordinate node to write the data. The subordinate node can be one of the example subordinate nodes 106 as depicted in FIG. 1. The write request can be a write without snoop request. The subordinate node 106 can include a write address for writing the data.

As shown in block 550, the home node 104 can receive an acknowledgement that the data can be written. The home node 104 can receive the acknowledgement from the subordinate node 106. The subordinate node 106 can determine there is sufficient space for the data, and in response, send the acknowledgement.

As shown in block 560, the home node 104 can send the data to the subordinate node 106. The subordinate node 106 can write the data in the write address to perform the memory copy. The home node 104 can also send an acknowledgement to the first request node 102 that the memory copy has been performed.

Figure 6:
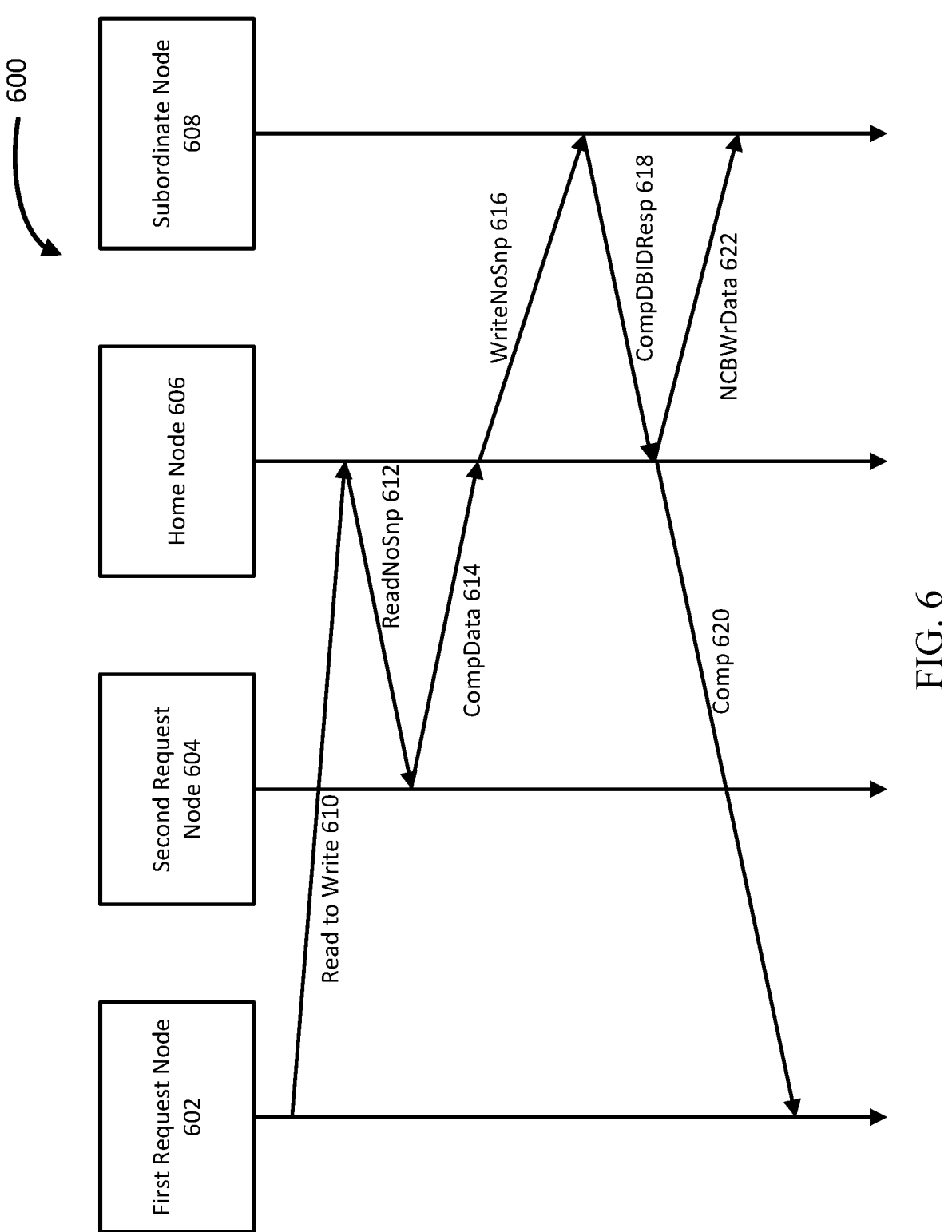
FIG. 6 depicts a swim diagram of example transactions that can occur when performing memory copy where data for copying originates from a request node according to aspects of the disclosure.

FIG. 6 depicts a swim diagram of example transactions 600 that can occur when performing memory copy in a mesh network where data for copying originates from a request node. The swim diagram can include a first request node 602, a second request node 604, a home node 606, and a subordinate node 608.

As an example, the first request node 602 can send a read request, such as a read to write transaction 610, to the home node 606 to access devices or storage media from or to which data can be read or written. The home node 606 can send a read request, such as a ReadNoSnp transaction 612, to a read address of the second request node 604. The second request node 604 can send a combined read data and completion response, such as a CompData transaction 614, back to the home node 606. The home node 606 can send a write request, such as a WriteNoSnp transaction 616, requesting to copy the data to a write address of the subordinate node 608. The subordinate node 608 can send a combined data request and completion response, such as a CompDBIDResp transaction 618, to the home node 606. The CompDBIDResp transaction 618 can indicate that the write address of the subordinate node 608 can accept write data and/or that the write request is observable by other request nodes. The home node 606 can send a completion response, such as a Comp transaction 620, to the first request node 602. The home node 606 can further send the write data, such as a NCBWrData transaction 622, to the write address of the subordinate node 608 to instruct the subordinate node 608 to perform the copy function.

Figure 7:
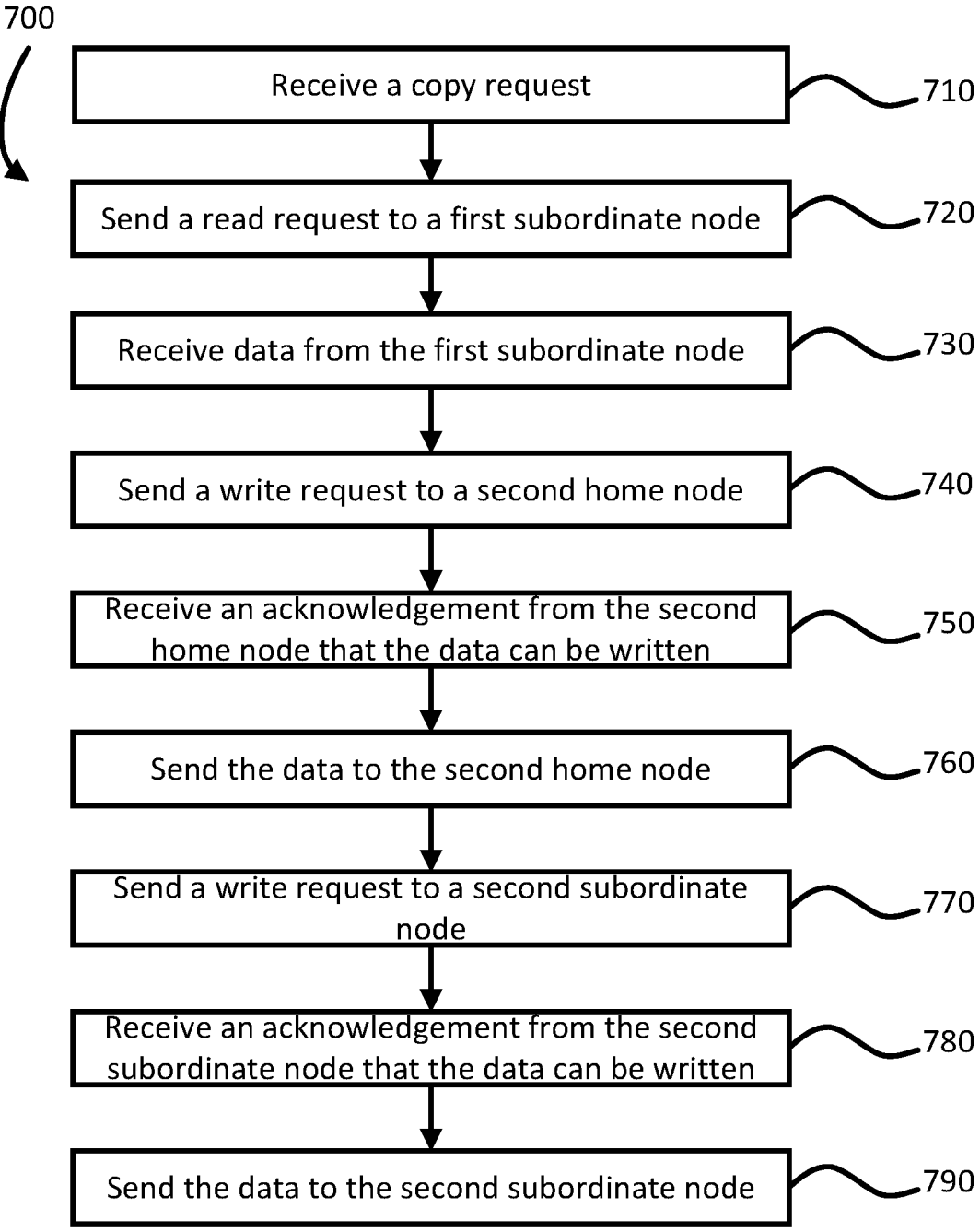
FIG. 7 depicts a flow diagram of an example process for performing memory copy in a mesh network with multiple home nodes according to aspects of the disclosure.

FIG. 7 depicts a flow diagram of an example process 700 for performing memory copy in a mesh network with multiple home nodes. The example process 700 can be performed on a system of one or more processors in one or more locations, such as example home nodes 104 of the mesh network 100 as depicted in FIG. 1.

As shown in block 710, a first home node 104 can receive a copy request to copy data. The first home node 104 can receive the copy request from a request node, such as an example request node 102 as depicted in FIG. 1.

As shown in block 720, the first home node 104 can send a read request to a first subordinate node to read the data. The first subordinate node can be one of the example subordinate nodes 106 as depicted in FIG. 1. The read request can be a read without snoop request. The first subordinate node 106 can include a read address for reading the data.

As shown in block 730, the first home node 104 can receive the data from the first subordinate node 106. The first home node 104 can also receive an acknowledgment from the first subordinate node 106 that the data has been read. The first home node 104 can receive the data and the acknowledgement in a combined transaction or in separate transactions. The first subordinate node 106 can determine the data is included in the read address, and in response, send the acknowledgement and the data.

As shown in block 740, the first home node 104 can send a write request to a second home node to write the data. The second home node can be one of the example home nodes 104 as depicted in FIG. 1. The write request can be a write without snoop request. The second home node 104 can include a write address for writing the data.

As shown in block 750, the first home node 104 can receive an acknowledgement that the data can be written. The first home node 104 can receive the acknowledgement from the second home node 104. The second home node 104 can determine there is sufficient space for the data, and in response, send the acknowledgement.

As shown in block 760, the first home node 104 can send the data to the second home node 104. The second home node 104 can write the data in the write address.

As shown in block 770, the second home node 104 can send a write request to a second subordinate node to write the data. The second subordinate node can be one of the example subordinate nodes 106 as depicted in FIG. 1. The write request can be a write without snoop request. The second subordinate node 106 can include a write address for writing the data.

As shown in block 780, the second home node 104 can receive an acknowledgement that the data can be written. The second home node 104 can receive the acknowledgement from the second subordinate node 106. The second subordinate node 106 can determine there is sufficient space for the data, and in response, send the acknowledgement.

As shown in block 790, the second home node 104 can send the data to the second subordinate node 106. The second subordinate node 106 can write the data in the write address to perform the memory copy. The second home node 104 can also send an acknowledgement to the first home node 104 that the memory copy has been performed. The first home node 104 can then send an acknowledgment to the request node 102 that the memory copy has been performed. The second home node 104 can also send the acknowledgement directly to the request node 102 that the memory copy has been performed.

Figure 8:
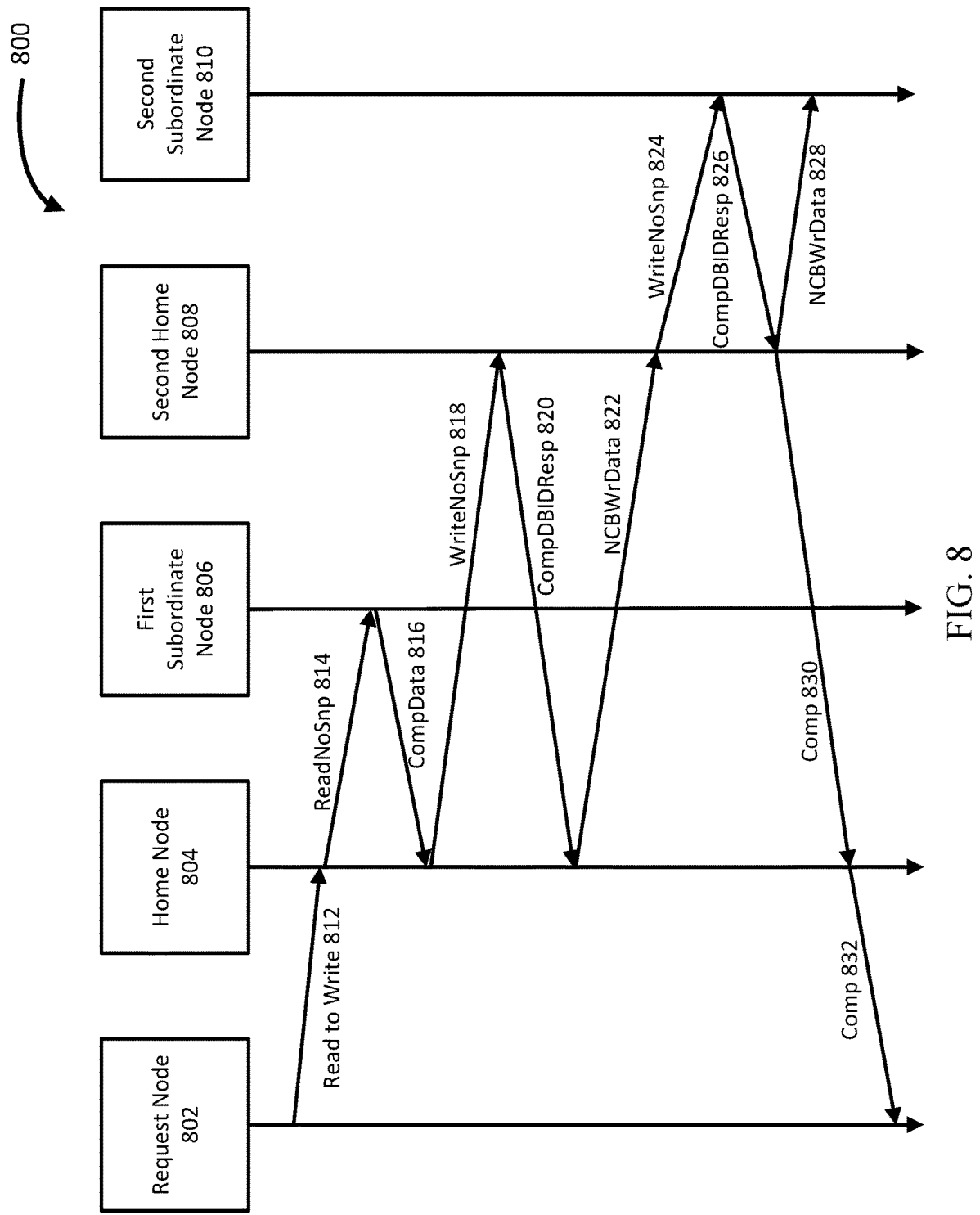
FIG. 8 depicts a swim diagram of example transactions that can occur when performing memory copy with multiple home nodes according to aspects of the disclosure.

FIG. 8 depicts a swim diagram of example transactions 800 that can occur when performing memory copy with multiple home nodes in a mesh network. The swim diagram can include a request node 802, a first home node 804, a first subordinate node 806, a second home node 808, and a second subordinate node 810.

As an example, the request node 802 can send a read request, such as a read to write transaction 812, to the first home node 804 to access devices or storage media from or to which data can be read or written. The first home node 804 can send a read request, such as a ReadNoSnp transaction 814, to a read address of the first subordinate node 806. The first subordinate node 806 can send a combined read data and completion response, such as a CompData transaction 816, back to the first home node 804. The first home node 804 can send a write request, such as a WriteNoSnp transaction 818, requesting to copy the data to a write address of the second home node 808. The second home node 808 can send a combined data request and completion response, such as a CompDBIDResp transaction 820, to the first home node 804. The CompDBIDResp transaction 820 can indicate that the write address of the second home node 808 can accept write data and/or that the write request is observable by other request nodes. The first home node 804 can send the write data, such as a NCBWrData transaction 822, to the write address of the second home node 808.

The second home node 808 can send a write request, such as a WriteNoSnp transaction 824, requesting to copy the data to a write address of the second subordinate node 810. The second subordinate node 810 can send a combined data request and completion response, such as a CompDBIDResp transaction 826, to the second home node 808. The CompDBIDResp transaction 826 can indicate that the write address of the second subordinate node 810 can accept write data and/or that the write request is observable by other request nodes. The second home node 808 can send the write data, such as a NCBWrData transaction 828, to the write address of the second subordinate node 810 to instruct the subordinate node 810 to perform the copy function. The second home node 808 can send a completion response, such as a Comp transaction 830, to the first home node 804. The first home node 804 can send another completion response, such as a Comp transaction 832, to the request node 802 to indicate the memory copy has been performed.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for copying data in a mesh network comprising:
    receiving, by one or more processors, a copy request from a request node of the mesh network to copy data to a destination;
    sending, by the one or more processors, a read without snoop request to a first subordinate node of the mesh network, wherein the first subordinate node and the request node are different nodes;
    receiving, by the one or more processors, the data from the first subordinate node;
    sending, by the one or more processors, a write without snoop request to a second subordinate node of the mesh network to write the data with a new write address;
    receiving, by the one or more processors, an acknowledgement from the second subordinate node that the data can be written to the second subordinate node;
    based on receiving the acknowledgement from the second subordinate node, sending, by the one or more processors, the data to the second subordinate node; and
    sending, by the one or more processors, an acknowledgement to the request node that the copy request has been performed.

2. The method of claim 1, wherein the copy request comprises a read to write request.

3. The method of claim 1, wherein the first subordinate node comprises one or more read addresses.

4. The method of claim 1, wherein the second subordinate node comprises one or more write addresses.

5. The method of claim 1, further comprising receiving, by the one or more processors, an acknowledgement from the first subordinate node that the data has been read.

6. The method of claim 5, wherein the data from the first subordinate node and the acknowledgement that the data has been read are received in a combined transaction.

7. The method of claim 1, further comprising:

sending, by the one or more processors, a write without snoop request to a home node of the mesh network to write the data with a new write address;

receiving, by the one or more processors, an acknowledgement from the home node that the data can be written to the home node; and sending, by the one or more processors, the data to the home node.

8. The method of claim 1, wherein the first subordinate node is a second request node.

9. The method of claim 1, wherein the one or more processors comprise a system level cache.

10. A system comprising:

one or more processors; and one or more storage devices coupled to the one or more processors and storing instructions that, when executed by the one or more processors, cause the one or more processors to perform operations for copying data in a mesh network, the operations comprising:

receiving a copy request from a request node of the mesh network to copy data to a destination;

sending a read without snoop request to a first subordinate node of the mesh network, wherein the first subordinate node and the request node are different nodes;

receiving the data from the first subordinate node;

sending a write without snoop request to a second subordinate node of the mesh network to write the data with a new write address;

receiving an acknowledgement from the second subordinate node that the data can be written to the second subordinate node;

based on receiving the acknowledgement from the second subordinate node, sending the data to the second subordinate node; and sending an acknowledgement to the request node that the copy request has been performed.

11. The system of claim 10, wherein the copy request comprises a read to write request.

12. The system of claim 10, wherein the first subordinate node comprises one or more read addresses.

13. The system of claim 10, wherein the second subordinate node comprises one or more write addresses.

14. The system of claim 10, wherein the operations further comprise receiving an acknowledgement from the first subordinate node that the data has been read.

15. The system of claim 14, wherein the data from the first subordinate node and the acknowledgement that the data has been read are received in a combined transaction.

16. The system of claim 10, wherein the operations further comprise:

sending a write without snoop request to a home node of the mesh network to write the data with a new write address;

receiving an acknowledgement from the home node that the data can be written to the home node; and sending the data to the home node.

17. The system of claim 10, wherein the first subordinate node is a second request node.

18. The system of claim 10, wherein the one or more processors comprise a system level cache.

19. A non-transitory computer readable medium for storing instructions that, when executed by one or more processors, cause the one or more processors to perform operations for copying data in a mesh network, the operations comprising:

receiving a copy request from a request node of the mesh network to copy data to a destination;

sending a read without snoop request to a first subordinate node of the mesh network, wherein the first subordinate node and the request node are different nodes;

receiving the data from the first subordinate node;

sending a write without snoop request to a second subordinate node of the mesh network to write the data with a new write address;

receiving an acknowledgement from the second subordinate node that the data can be written to the second subordinate node;

based on receiving the acknowledgement from the second subordinate node, sending the data to the second subordinate node; and sending an acknowledgement to the request node that the copy request has been performed.

20. The non-transitory computer readable medium of claim 19, wherein the operations further comprise receiving an acknowledgement from the first subordinate node that the data has been read.

* * * * *